United States Patent [19]

Lienau et al.

[11] 4,091,710

[45] May 30, 1978

[54] THERMAL BATTERY FIRING MECHANISM

[75] Inventors: Jeffrey A. Lienau; Gerald H. Matthews, both of Huntsville, Ala.

[73] Assignee: The United States of America as represented by the Secretary of the Army, Washington, D.C.

[21] Appl. No.: 779,220

[22] Filed: Mar. 18, 1977

[51] Int. Cl.² .............................................. F41F 3/04
[52] U.S. Cl. .................... 89/1.814; 89/1.816
[58] Field of Search .............. 89/1.814, 1.813, 1.812, 89/1.816, 1.8

[56] References Cited

U.S. PATENT DOCUMENTS

| | | | |
|---|---|---|---|
| 2,972,933 | 2/1961 | Guthrie et al. | 89/1.814 |
| 3,371,578 | 3/1968 | Choate et al. | 89/1.814 X |
| 3,444,778 | 5/1969 | Bates | 89/1.816 X |
| 3,750,529 | 8/1973 | Reed et al. | 89/1.816 X |
| 3,786,717 | 1/1974 | Vickers et al. | 89/1.814 |
| 3,960,054 | 1/1976 | Looger | 89/1.816 |

*Primary Examiner*—David H. Brown
*Attorney, Agent, or Firm*—Nathan Edelberg; Robert P. Gibson; James T. Deaton

[57] ABSTRACT

A thermal battery firing mechanism for a lightweight portable rocket launcher in which the thermal battery firing mechanism includes means for actuating a thermal battery for supplying an electrical pulse to a rocket carried in the launcher for ignition of the rocket motor. The means for actuating the thermal battery includes three safety type means which prevent accidental actuation of the firing button for the thermal battery.

9 Claims, 10 Drawing Figures

U. S. Patent   May 30, 1978   Sheet 3 of 3   4,091,710

THERMAL BATTERY FIRING MECHANISM

DEDICATORY CLAUSE

The invention described herein may be manufactured, used, and licensed by or for the Government for governmental purposes without the payment to us of any royalties thereon.

BACKGROUND OF THE INVENTION

In recent years there has been developed folding fin stabilized rockets which can be fired by one man from a lightweight portable launcher. The rockets normally have a high explosive warhead and are extremely useful against tanks and vehicles. Since the launcher must be portable, weight is a prime consideration in such launcher design. Additionally, the launcher must have a relatively long shelf life.

The rocket launcher essentially comprises a long thin wall open end tube or barrel which is proportioned to receive a rocket. The launcher may be man transportable and capable of being fired from an individual's shoulder or from other conventional support structures. The tube may be of the telescoping type so as to provide a length which is sufficiently greater than the rocket so that the propellant blast of the rocket will have substantially subsided before the rocket leaves the tube. The rocket firing mechanism, when actuated, closes an electrical circuit thereby effecting discharge of the rocket.

In the past, other rocket firing mechanisms have not always been lightweight and made of solid state materials which lend to a rugged and simple firing mechanism. Also, previously developed firing mechanisms have used many metal parts some of which require machining. Therefore, it can be seen that a simple firing mechanism that can be made from moldable plastic and with a very simple design is needed.

Accordingly, it is an object of this invention to provide a firing mechanism that can be made almost exclusively of moldable plastic parts.

Another object of this invention is to eliminate components by using the same component for multiple functions.

Still another object of this invention is to use a flexible printed circuit for mounting the electrical component and for utilizing a switch contact on a trigger member of the firing mechanism to interconnect with printed circuit leads of the printed circuit to disable and arm the rocket launcher.

Still another object of this invention is to provide a firing mechanism in which is contained a rear sight peep, safety, and a tube interlock.

A still further object of this invention is to provide a firing mechanism that has safety capable of preventing firing of the rocket when dropped or crushed.

SUMMARY OF THE INVENTION

In accordance with this invention, a thermal battery firing mechanism is provided that includes a rocket launching tube that has two telescoping sections with a cam on the inner section for actuating a pin in the outer section to disengage a firing button interlock from the firing button that is contained within the firing mechanism that is mounted on the outer surface of one of the tubes. A sight gate is pivotally mounted as a part of the firing mechanism and is snapped to an open position to expose a safety and the firing button. The safety is mounted in the firing mechanism housing and slides linearly to allow the firing button to be actuated. The safety has a switch contact thereon that makes contact with a printed circuit that controls the firing of a missile in the launching tube and the switch contact enables the circuit when the safety is actuated to the firing position. The firing button holds a firing pin in a retracted position in which a spring is mounted in compression to bias the firing pin in a direction for striking a thermal battery. When the firing pin is actuated, the firing pin is released to allow the compression spring to bias the firing pin into engagement with the thermal battery and cause the thermal battery to be ignited. The thermal battery then supplies energy for igniting the rocket in the launching tube.

DESCRIPTION OF THE PREFERRED EMBODIMENT

Figure 1:
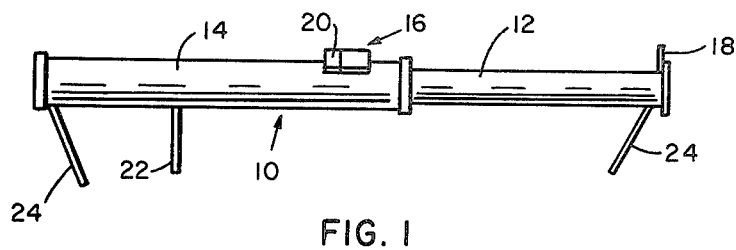
FIG. 1 is a perspective view of a launcher with the firing mechanism according to this invention.
Figure 2:
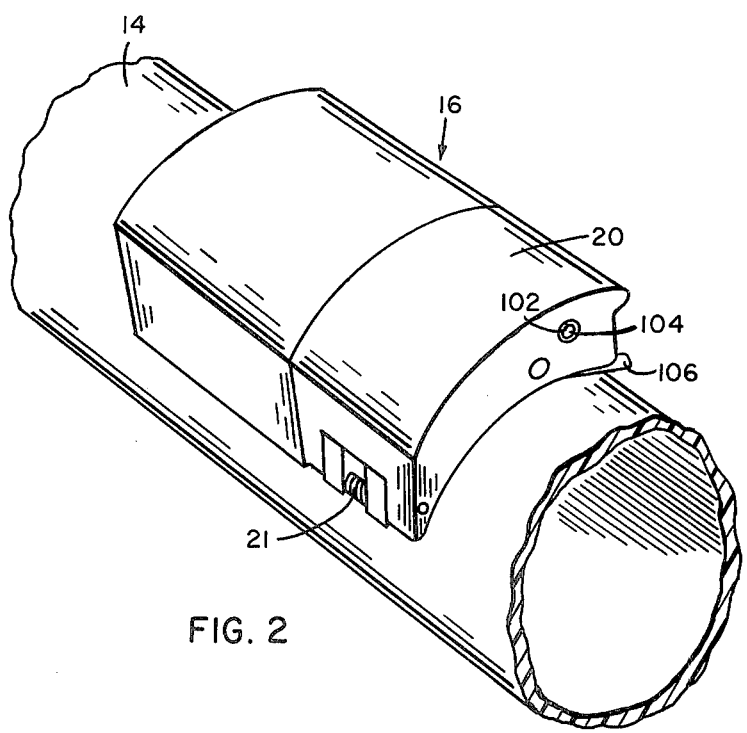
FIG. 2 is a perspective view showing the firing mechanism enlarged with the launcher partially cut away.

Referring now to the drawings, FIG. 1 shows a rocket launcher 10 that has an inner tube 12 and an outer tube 14 that telescope together and as illustrated are in an extended position. Firing mechanism 16 is mounted on the outer surface of tube 14 and includes a rear peep sight and cover device 20 for aligning with sight bead 18 and the launcher with a target. This is accomplished by sighting through opening 104 in pivoted member 106 to align bead 18 with the target. At night member 106 is pivoted clockwise to allow larger opening 102 to be used in aligning bead 18 with the target. A spring 21 (see FIG. 2) biases peep sight and cover member 20 to the citing position illustrated in FIG. 3 for accomplishing the sighting operation.

Figure 4:
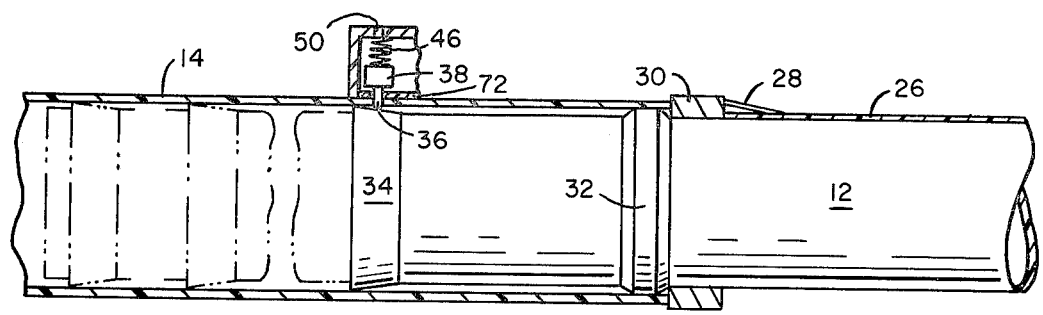
FIG. 4 is a schematic partial sectional view of the launch tube and the firing mechanism illustrating the action of the cam on the inner tube section with the pin that is mounted in the outer tube section.
Figure 6:
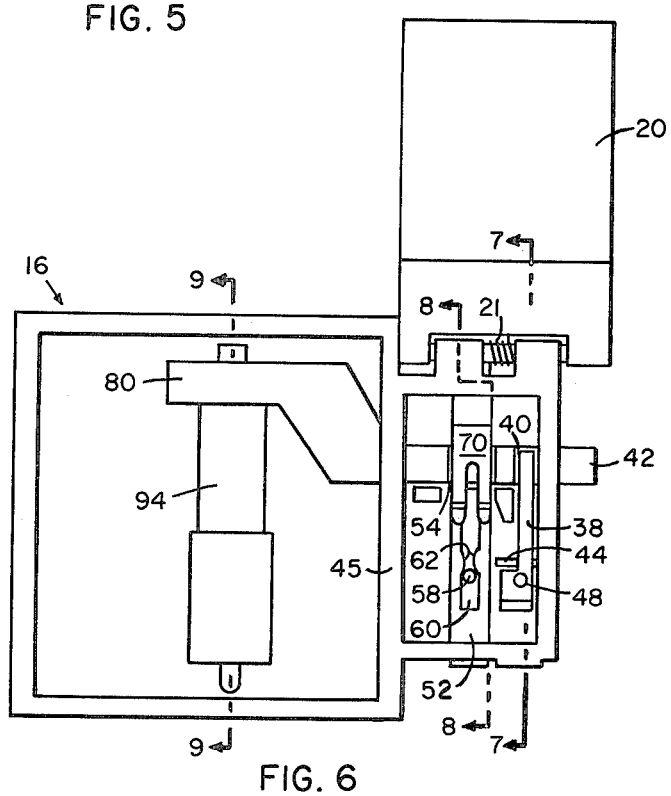
FIG. 6 is a view looking into the firing mechanism with the firing mechanism removed from the launcher in accordance with this invention.
Figure 7:
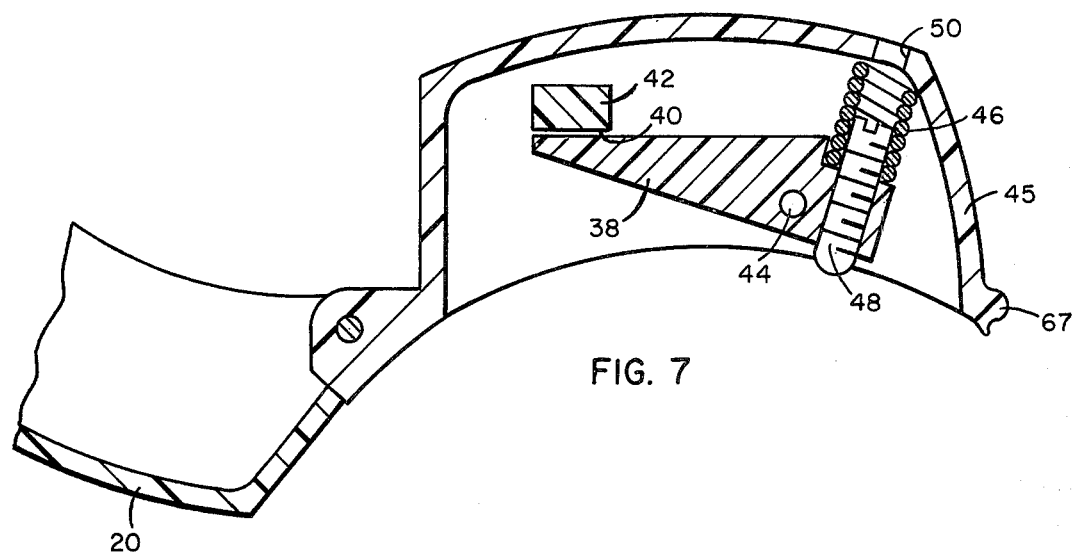
FIG. 7 is a sectional view along ling 7—7 of FIG. 6.

A shoulder rest 22 is also secured in a conventional manner to tube 14 for resting against the shoulder of one who fires a rocket from the rocket launcher. A strap 24 is also connected to inner and outer tubes 12 and 14 for carrying the rocket launcher. As shown in FIG. 4, inner tube 12 has a guide 26 that slides in a groove of end member 30 of outer tube 14 and spring detent 28 snaps to an outward position as illustrated to lock the inner and outer tubes in an extended position when the inner and outer tubes are moved to the extended position illustrated. Inner member 12 also has cams 32 and 34 mounted thereon for guiding inner member 12 and outer member 14 and for actuating pin 36 to release firing button interlock 38 from groove 40 (see FIG. 6) of firing button 42. Firing button interlock 38 is pivoted at 44 in housing 45 and spring 46 biases firing button interlock 38 into groove 40. Set screw 48 is utilized for providing adjustment between pin 36 and firing button interlock 38. Housing 45 has an opening 50 through which set screw 48 can be adjusted.

Figure 8:
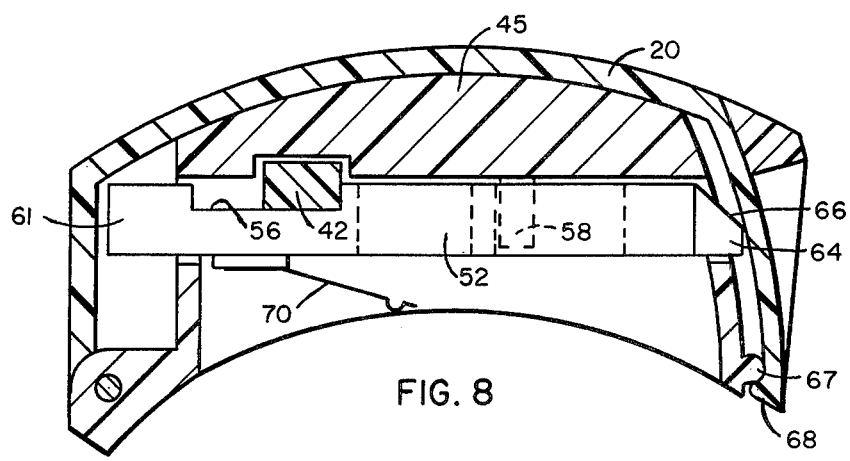
FIG. 8 is a sectional view along line 8—8 of FIG. 6 illustrating the peep sight closure in a closed position.

Housing 45 also slidably mounts firing button 42 therein in a conventional manner and safety 52 (see FIG. 8) is slidably mounted in the housing for movement perpendicular to firing button 42 for release of the firing button when desired. Firing button 42 has a second groove 54 (see FIG. 6) therein that safety 52 overlaps and maintains firing button 42 in a safe position until safety 52 is actuated to cause groove 56 (see FIG. 8) of safety 52 to overlap with groove 54 in the firing button. This allows firing button 42 to be moved linearly in housing 45 for actuating the firing pin for a thermal battery. Safety 52 is maintained in position of safety on or safety off by a pin 58 mounted in the housing and by cutout 60 (see FIG. 6) in safety member 52. When safety 52 is moved from safe position to firing position, protrusions 62 of cutout 60 are snapped past pin 58 to maintain safety 52 in the position to which it is actuated. End 61 (see FIG. 8) of safety 52 is utilized for movement of the safety to a firing postion which allows firing button 42 to be actuated. The opposite end 64 of safety 52 has a tapered surface 66 which cooperates with edge 68 of cover 20 to force safety 52 back into a safe position when the rocket has not been fired and it is desired to close cover 20. Bead 67 cooperates with edge 68 to hold cover 20 closed. Safety 52 also has a switch contact 70 mounted thereon which contacts printed circuit leads 74 and 76 (see FIG. 5) of flexible printed circuit 72 at positions 1 and 3 to initially ground the squib for the rocket. When safety 52 is moved to the arming position, switch contact 70 interconnects positions 5 and 7 of leads 74 and 78 to connect the squib to the firing circuit. As can be seen, a switch is made of the printed circuit leads 74, 76, and 78 and flexible switch contact 70. Printer circuit 72 is mounted between firing mechanism 16 and outer tube 14 in a conventional manner as illustrated in FIG. 4.

Figure 9:
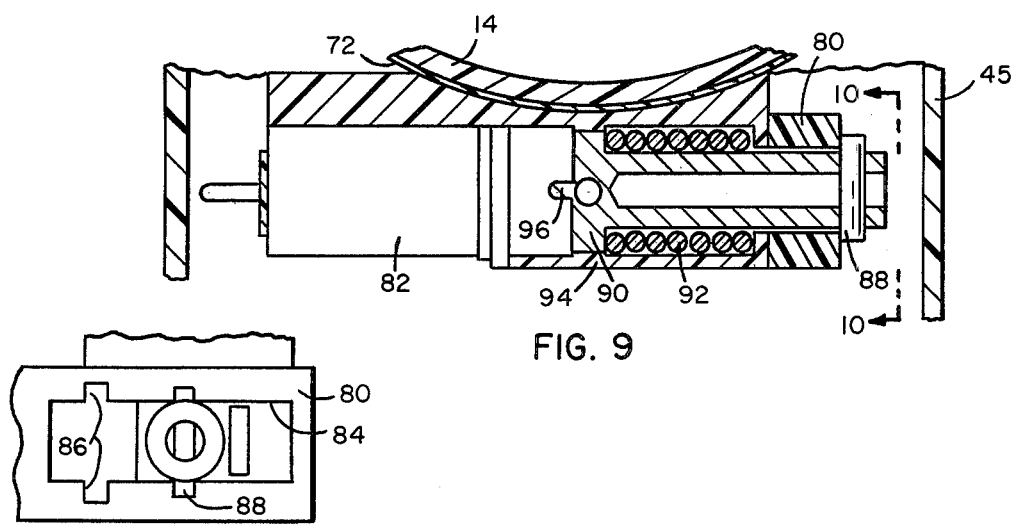
FIG. 9 is a sectional view along line 9—9 of FIG. 6.
Figure 10:
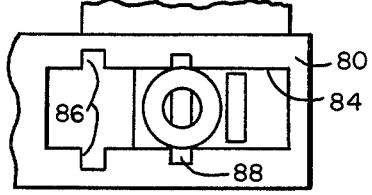
FIG. 10 is a view looking in the direction of line 10—10 of FIG. 9.

Firing button 42 is connected at opposite end 80 (see FIGS. 6 and 9) to actuating firing mechanism for thermal battery 82. End 80 of firing button 42 has a rectangular opening 84 therethrough and slots 86 for accommodating latch pin 88 which holds firing pin 90 in position against the force applied by spring 92. Firing pin 90 is mounted in housing 94 for guided linear movement of pin 90 in a conventional manner. Firing pin 90 has a tip 96 for striking a percussion end of thermal battery 82 and causes it to ignite. Thermal battery 82 is connected to turn up lead ends 98 and 100 of printed circuit 72 in a conventional manner and other circuitry for causing ignition of a squib in a rocket motor in a conventional manner. Housing 94 is secured to the launch tube in a conventional manner such as illustrated in FIG. 9.

Figure 3:
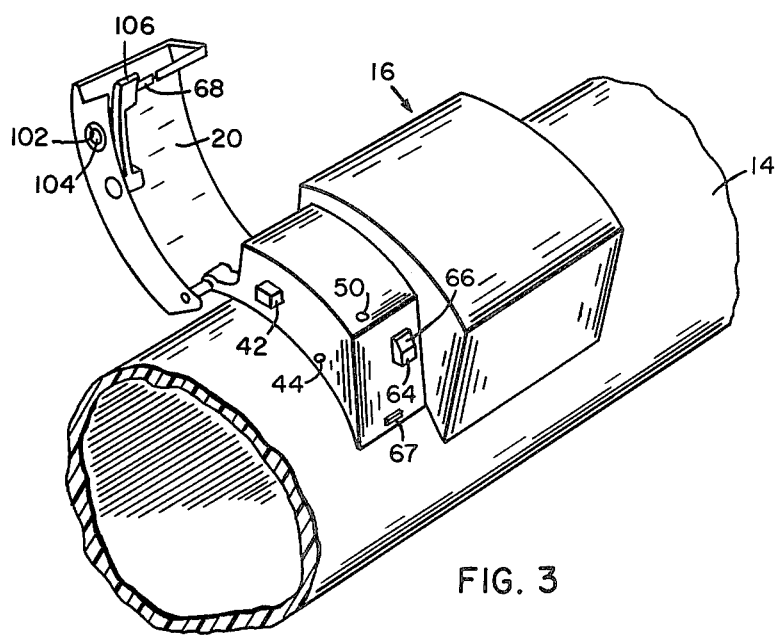
FIG. 3 is another perspective view of the firing mechanism with the peep sight cover in the firing position and illustrating the launching tube partially cut away.
Figure 5:
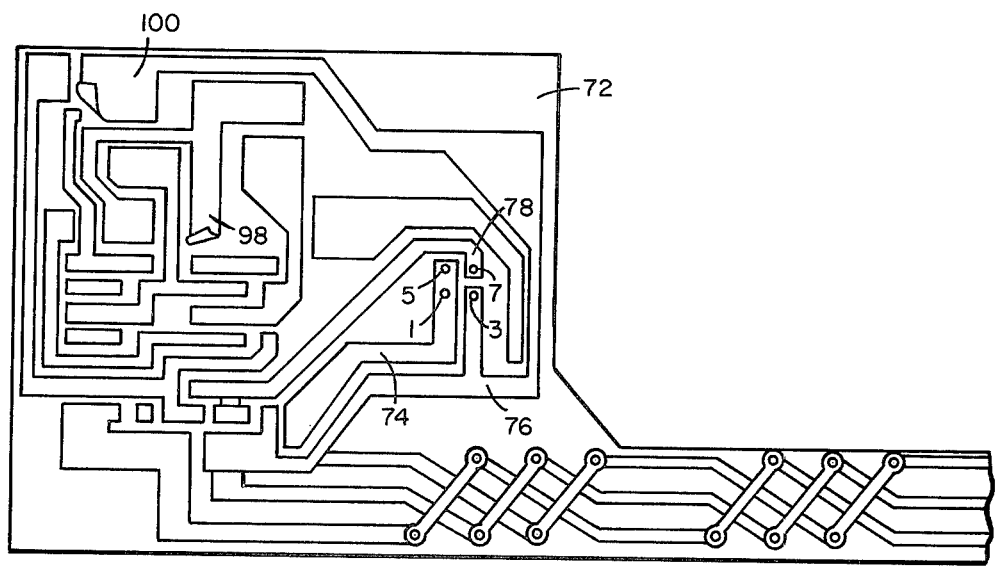
FIG. 5 is a view of a flexible printed circuit in accordance with this invention.

In operation, rocket launcher 10 is normally telescoped into a retracted position and actuated into an extended position as illustrated in FIG. 1. When launch tube 12 is extended relative to tube 14, cam 34 actuates pin 36 against set screw 48 to actuate firing button interlock 38 and disengage firing button interlock 38 from groove 40 in firing button 42. With the firing button interlock 38 released, sight gate 20 is snapped open to release end 68 from bead 67. Spring 21 (see FIG. 2) then biases sight gate 20 to the position for firing as illustrated in FIG. 3. With sight gate cover 20 in the firing or launching position, end 61 of safety 52 can be pushed to release firing button 42 for linear movement. Also, as safety 52 is actuated, switch contact 70 moves from position 1-3 to position 5-7 as illustrated in FIG. 5 to connect the squib of the rocket to the firing circuit. The rocket is now ready for firing and is accomplished by sighting through opening 102 in sight gate 20 or by sighting through opening 104 in pivoted member 106 and aligning the launcher with a target by sighting with bead 18. With the rocket launcher aligned with the target, firing button 42 is actuated to cause the firing button to move linearly relative to housing 94 and cause grooves 86 to be actuated into alignment with pin 88 and allow spring 92 to actuate firing pin 90 and tip 96 into engagement with a percussion primer area of thermal battery 82 to cause thermal battery 82 to be ignited and supply energy through the leads connected thereto to the firing squib of the rocket motor which causes the rocket to be launched. This device is designed to be a one shot device and once the rocket has been launched, the rocket launcher is discarded.

We claim:

1. A fire control mechanism for a portable rocket launcher comprising: a housing; a thermal battery with percussion means and mounted in said housing; a spring biased firing pin mounted for linear movement and disposed for impact with said percussion means for energizing said thermal battery and generating an electrical signal to cause ignition of a rocket carried in said launcher; actuating firing mechanism disposed for effecting displacement of said firing pin for impact thereof with said percussion means, said actuating firing mechanism comprising: a firing button slidably mounted in said housing, said firing button having first and second ends, said first end being provided with means for cooperating with a latch pin on said firing pin until said firing button has been slid to a position which releases said latch pin for actuation of said firing pin, said second end of said firing button being disposed for slidably moving said firing button when it is desired to fire the rocket, said firing button having two spaced grooves therein intermediate said first and second ends; a safety slidably mounted in said housing and having means thereon which cooperates with one of said two spaced grooves to prevent actuation of said firing button until said safety has been moved to a safety firing position; and an interlock button mounted in said housing and cooperating with the other of said two grooves for preventing movement of said firing button until said interlock button has been actuated out of said other groove.

2. A fire control mechanism as set forth in claim 1, wherein said interlock button is actuated out of said other groove by a pin and cam arrangement between inner and outer tubes of said launcher.

3. A fire control mechanism as set forth in claim 1, wherein said second end of said firing button projects outside of said housing for actuating said firing button, wherein said safety has a first end for actuating said safety and said first end projecting outside of said housing.

4. a fire control mechanism as set forth in claim 3, wherein said housing has a cover pivotably mounted thereon and said cover encloses said first end of said safety and said second end of said firing button when in a closed position.

5. A fire control mechanism as set forth in claim 4, wherein a printed circuit is disposed for electrically interconnecting said thermal battery to said rocket, and said safety has a contact thereon which makes contact with leads on said printed circuit for grounding the circuit to the rocket when said safety is in a safe position and for interconnecting other leads on the printed circuit for connecting the circuit to the rocket when the safety is in a firing position.

6. A fire control mechanism as set forth in claim 4, wherein said cover is spring biased toward an open position, and said cover has a rear peep sight opening means thereon for use with a sight bead on said launcher for aligning said launcher with a target.

7. A fire control mechanism as set forth in claim 6, wherein said peep sight opening means includes a member pivotably mounted on said cover, and said member having a small opening therethrough that can be aligned with a larger opening through said cover.

8. A fire control mechanism as set forth in claim 4, wherein said cover has an edge thereon and said housing having means thereon for cooperating with said edge to hold said cover in a closed position.

9. A fire control mechanism as set forth in claim 8, wherein said safety has a second end which projects through said housing and said edge cooperating with said second end of said safety to move the safety to a safe position when closing said cover.

* * * * *